United States Patent
Liu et al.

(10) Patent No.: US 9,946,386 B2
(45) Date of Patent: Apr. 17, 2018

(54) DISPLAY PANEL FOR DETECTING BIOMETRIC INFORMATION AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Weijie Zhao, Beijing (CN); Changfeng Li, Beijing (CN); Xiaoliang Ding, Beijing (CN); Shengji Yang, Beijing (CN); Hongjuan Liu, Beijing (CN); Wei Liu, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/325,437

(22) PCT Filed: Jul. 1, 2016

(86) PCT No.: PCT/CN2016/088175
§ 371 (c)(1),
(2) Date: Jan. 10, 2017

(87) PCT Pub. No.: WO2017/012461
PCT Pub. Date: Jan. 26, 2017

(65) Prior Publication Data
US 2017/0199606 A1    Jul. 13, 2017

(30) Foreign Application Priority Data

Jul. 21, 2015    (CN) .......................... 2015 1 0432466

(51) Int. Cl.
*G06F 3/041*    (2006.01)
*G06K 9/00*    (2006.01)
(Continued)

(52) U.S. Cl.
CPC .......... *G06F 3/0412* (2013.01); *G02F 1/1368* (2013.01); *G02F 1/13318* (2013.01);
(Continued)

(58) Field of Classification Search
CPC ..................................................... G06F 3/0412
(Continued)

(56) References Cited

U.S. PATENT DOCUMENTS

2006/0017862 A1    1/2006  Song et al.
2007/0131936 A1*   6/2007  Kang ................... G02F 1/1354
                                                    257/72
(Continued)

FOREIGN PATENT DOCUMENTS

CN        1689025 A    10/2005
CN      103019476 A     4/2013
(Continued)

OTHER PUBLICATIONS

International Search Report & Written Opinion dated Sep. 22, 2016 regarding PCT/CN2016/088175.
(Continued)

*Primary Examiner* — Long D Pham
(74) *Attorney, Agent, or Firm* — Intellectual Valley Law, P.C.

(57) ABSTRACT

The present application discloses a display panel having an array of a plurality of pixel units, each pixel unit including
(Continued)

at least three subpixels for image display, at least some of the plurality of pixel units including a semiconductor photodetector for detecting biometric information; a plurality of first scan lines and a plurality of data lines, each first scan line being connected to a row of subpixels, each data line being connected to a column of subpixels; each subpixel including a first transistor for image display; a plurality of common voltage terminals, each common voltage terminal being connected to a semiconductor photodetector; a plurality of second scan lines, each second scan line being connected to a plurality of semiconductor photodetectors for providing a control voltage signal; each semiconductor photodetector having a second transistor; the second transistor being a phototransistor having a gate node connected to a corresponding second scan line for receiving the control voltage signal to turn on the second transistor, and a first node connected to a corresponding common voltage terminal; and a plurality of read lines, each read line being connected to each semiconductor photodetector in a column of pixel units.

20 Claims, 6 Drawing Sheets

(51) Int. Cl.
| | |
|---|---|
| *G02F 1/1333* | (2006.01) |
| *G02F 1/1362* | (2006.01) |
| *G02F 1/133* | (2006.01) |
| *G02F 1/1343* | (2006.01) |
| *G02F 1/1368* | (2006.01) |

(52) U.S. Cl.
CPC .... *G02F 1/13338* (2013.01); *G02F 1/134309* (2013.01); *G02F 1/136286* (2013.01); *G06F 3/0416* (2013.01); *G06K 9/00013* (2013.01); *G02F 2001/134345* (2013.01); *G02F 2201/58* (2013.01)

(58) Field of Classification Search
USPC .......................................................... 345/173
See application file for complete search history.

(56) References Cited

U.S. PATENT DOCUMENTS

| | | | |
|---|---|---|---|
| 2007/0216657 A1 | 9/2007 | Konicek | |
| 2011/0069020 A1* | 3/2011 | Kim ....................... | G06F 3/0412 345/173 |
| 2012/0139866 A1* | 6/2012 | Jung ..................... | G06F 3/0421 345/174 |
| 2015/0144945 A1* | 5/2015 | Kusunoki ............. | H01L 27/124 257/43 |
| 2016/0048717 A1 | 2/2016 | Yang et al. | |

FOREIGN PATENT DOCUMENTS

| | | |
|---|---|---|
| CN | 104112120 A | 10/2014 |
| CN | 104155785 A | 11/2014 |
| CN | 104200768 A | 12/2014 |
| CN | 104282265 A | 1/2015 |
| CN | 104991364 A | 10/2015 |
| CN | 204807870 U | 11/2015 |

OTHER PUBLICATIONS

First Office Action in the Chinese Patent Application No. 201510432466.3, dated Aug. 28, 2017; English translation attached.

* cited by examiner

DISPLAY PANEL FOR DETECTING BIOMETRIC INFORMATION AND DRIVING METHOD THEREOF

CROSS-REFERENCE TO RELATED APPLICATION

This application is a national stage application under 35 U.S.C. § 371 of International Application No. PCT/CN2016/088175, filed Jul. 1, 2016, which claims priority to Chinese Patent Application No. 201510432466.3, filed Jul. 21, 2015, the contents of which are incorporated by reference in the entirety.

TECHNICAL FIELD

The present invention relates to display technology, more particularly, to a display panel, a display apparatus having the same, and a driving method thereof.

BACKGROUND

Liquid crystal display (LCD) is characterized by its low radiation and advantages of small size and low power consumption and has been widely used in tablet PCs, TVs or mobile phones and other electronic products. However, conventional LCD monitors do not have any palmprint recognition functionality.

SUMMARY

In one aspect, the present invention provides a display panel comprising an array of a plurality of pixel units, each pixel unit comprising at least three subpixels for image display, at least some of the plurality of pixel units comprising a semiconductor photodetector for detecting biometric information; a plurality of first scan lines and a plurality of data lines, each first scan line being connected to a row of subpixels, each data line being connected to a column of subpixels; each subpixel comprises a first transistor for image display; a plurality of common voltage terminals, each common voltage terminal being connected to a semiconductor photodetector; a plurality of second scan lines, each second scan line being connected to a plurality of semiconductor photodetectors for providing a control voltage signal; each semiconductor photodetector comprises a second transistor; the second transistor being a phototransistor comprising a gate node connected to a corresponding second scan line for receiving the control voltage signal to turn on the second transistor, and a first node connected to a corresponding common voltage terminal; and a plurality of read lines, each read line being connected to each semiconductor photodetector in a column of pixel units.

Optionally, the display panel further comprises a plurality of touch electrodes and a plurality of touch signal lines, each touch electrode being connected to a touch signal line.

Optionally, the display panel further comprises a plurality of signal lines, each of which is connected to a plurality of common voltage terminals.

Optionally, each subpixel further comprises a pixel electrode; the second node of the first transistor being connected to the pixel electrode.

Optionally, the second node of each phototransistor is connected to a corresponding read line.

Optionally, each semiconductor photodetector further comprises a third transistor comprising a gate node, a first node connected to a second node of a corresponding second transistor, and a second node connected to a corresponding read line.

Optionally, the gate node of the third transistor is connected to a corresponding first scan line.

Optionally, each pixel unit comprises a red subpixel, a green subpixel, and a blue subpixel, wherein the semiconductor photodetector is in the blue subpixel.

Optionally, the plurality of first scan lines, the plurality of second scan lines, and the plurality of signal lines are configured to drive the plurality of pixel units; each first scan line in a first time period of each frame of image is configured to apply a first scan signal to each subpixel in the row of subpixels to allow a data signal be passed from a corresponding data line to the each subpixel to produce a subpixel of image based on the data signal; and each second scan line in a second time period of each frame of image is configured to apply a control voltage signal to each photoresistor in the row of subpixels and each signal line in a second time period is configured to apply a common voltage signal via the common voltage terminal to each photoresistor in the row of subpixels, for detecting a biometric signal in each pixel unit; the second time period being later in time than the first time period.

Optionally, the plurality of first scan lines, the plurality of second scan lines, and the plurality of signal lines are configured to drive the plurality of pixel units; the gate node of the third transistor is connected to a corresponding first scan line; each first scan line in a first time period of a frame of image is configured to apply a first scan signal to each subpixel in the row of subpixels, allowing a data signal be passed from a corresponding data line to the each subpixel to produce a subpixel of image based on the data signal; each second scan line in a second time period of each frame of image is configured to apply a control voltage signal to each photoresistor in the row of subpixels and each signal line in a second time period is configured to apply a common voltage signal via the common voltage terminal to each photoresistor in the row of subpixels, for detecting a biometric signal in each pixel unit; and each first scan line in the second time period of each frame of image is configured to apply a third scan signal to switch on the third transistor in the row of subpixels to transmit the biometric signal detected in each pixel unit to a corresponding read line; the second time period being later in time than the first time period.

Optionally, the plurality of first scan lines, the plurality of second scan lines, and the plurality of signal lines are configured to drive the plurality of pixel units; the gate node of the third transistor is connected to a corresponding first scan line; each first scan line in a first time period of each frame of image is configured to apply a first scan signal to each subpixel in the row of subpixels, allowing a first data signal be passed from a corresponding data line to the each subpixel to produce a subpixel of image based on the first data signal; each first scan line in a second time period of each frame of image is configured to apply a second scan signal to each subpixel in the row of subpixels to allow a second data signal be passed from a corresponding data line to the each subpixel to produce a subpixel of image based on the second data signal so that a substantially same illuminance level for each pixel is produced; and each second scan line in a second time period of each frame of image is configured to apply a control voltage signal to each photoresistor in the row of subpixels and each signal line in a second time period of each frame of image is configured to apply a common voltage signal via the common voltage terminal to each photoresistor in the row of subpixels, for detecting a biometric signal in each pixel unit; the second time period being later in time than the first time period.

Optionally, the display panel further comprises a plurality of touch electrodes and a plurality of touch signal lines, each touch electrode being connected to a touch signal line, wherein the gate node of the third transistor is connected to a corresponding first scan line; the plurality of first scan lines, the plurality of second scan lines, and the plurality of signal lines are configured to drive the plurality of pixel units; each first scan line in a first time period of each frame of image is configured to apply a first scan signal to each subpixel in the row of subpixels to allow a first data signal be passed from a corresponding data line to the each subpixel to produce a subpixel of image based on the first data signal; each touch signal line in a second time period of each frame of image is configured to apply a touch signal to each touch electrode for detecting a touch event at each touch electrode thereby determining a touch area comprising a plurality of subpixels where the touch event is detected; if a touch event is detected, the array substrate is configured to display an inserted image with equal illuminance level for each pixel; each first scan line in each frame of inserted image is configured to apply a second scan signal to each subpixel in the row of subpixels to allow a second data signal be passed from a corresponding data line to the each subpixel to produce a subpixel of image based on the second data signal so that a substantially same illuminance level for each pixel is produced; and each second scan line in each frame of inserted image is configured to apply a control voltage signal to each photoresistor in the row of subpixels in the touch area and each signal line in each frame of inserted image is configured to apply a common voltage signal via the common voltage terminal to each photoresistor in the row of subpixels in the touch area, for detecting a biometric signal in each pixel unit in the touch area.

Optionally, each first scan line in each frame of inserted image is configured to apply the second scan signal to each third transistor in the row of subpixels for transmitting the biometric signal at the each pixel unit to a corresponding read line.

Optionally, the plurality of touch electrodes are used for conducting touch signals in the second time period, and for applying common voltage in the first time period.

Optionally, at least one of the plurality of touch signal lines is used as a read line in each frame of inserted image, and used as a touch signal line in second time period of each frame of image.

Optionally, the control voltage signal is configured to be in a range such that a difference between a first photocurrent change corresponding to a touching ridge line and a second photocurrent change corresponding to a touching valley line is substantially maximized.

In another aspect, the present invention provides a display apparatus comprising a display panel described herein, and an active matrix organic light emitting display panel comprising an array of a plurality of active matrix organic light emitting diode pixel units, each active matrix organic light emitting diode pixel unit comprising one or more active matrix organic light emitting diode subpixels, each of which comprising an organic light emitting diode; each active matrix organic light emitting diode subpixel corresponding to one or more subpixel.

Optionally, the display apparatus further comprises a signal processer, the signal processor comprising a plurality of amplifiers connected to the plurality of read lines for amplifying read line signals, and a plurality of differentiators for generating a differential value based on amplified read line signals derived from two read line signals of any two neighboring read lines.

In another aspect, the present invention provides a method for driving an operation of the display panel described herein, comprising providing a plurality of first scan signals to the plurality of first scan lines in a first time period of each frame of image; each first scan line in the first time period applies a first scan signal to each subpixel in the row of subpixels to allow a data signal be passed from a corresponding data line to the each subpixel to produce a subpixel of image based on the data signal; and transmitting a plurality of biometric signals through the plurality of read lines; each read line in a second time period is configured to transmit a biometric signal from the each semiconductor photodetector, the second time period being later in time than the first time period.

Optionally, the method further comprises providing a plurality of control voltage signals to the plurality of second scan lines and providing a plurality of common voltage signals to a plurality of signal lines in the second time period of each frame of image; each second scan line in the second time period of each frame of image applies a control voltage signal to each photoresistor in the row of subpixels and each signal line in the second time period applies a common voltage signal via the common voltage terminal to each photoresistor in the row of subpixels for detecting a biometric signal in each pixel unit Optionally, the method further comprises providing a plurality of control voltage signals to the plurality of second scan lines and a plurality of common voltage signals to a plurality of signal lines in the second time period of each frame of image; each second scan line in the second time period of each frame of image applies a control voltage signal to each photoresistor in the row of subpixels and each signal line in the second time period applies a common voltage signal via the common voltage terminal to each photoresistor in the row of subpixels for detecting a biometric signal in each pixel unit; and providing a plurality of third scan signals to the plurality of first scan lines in the second time period of each frame of image; each first scan line in the second time period applies a third scan signal to switch on the third transistor in the row of subpixels for transmitting the biometric signal at the each pixel unit to a corresponding read line; the second time period being later in time than the first time period.

Optionally, the method further comprises providing a plurality of second scan signals to the plurality of first scan lines in the second time period of each frame of image; each first scan line in each frame of inserted image applies a second scan signal to each subpixel in the row of subpixels to allow a second data signal be passed from a corresponding data line to the each subpixel to produce a subpixel of image based on the second data signal so that a substantially same illuminance level for each pixel is produced; and providing a plurality of control voltage signal to the plurality of second scan lines in the second time period; providing a plurality of common voltage signals to a plurality of signal lines in the second time period; each second scan line in the second time period applies a control voltage signal to each photoresistor in the row of subpixels and each signal line in each frame of inserted image applies a common voltage signal via the common voltage terminal to each photoresistor in the row of subpixels, for detecting a biometric signal in each pixel unit.

Optionally, the method further comprises providing a plurality of touch signals to the plurality of touch electrodes in the second time period of each frame of image, each touch signal line in the second time period applies a touch signal to each touch electrode for detecting a touch event at each touch electrode thereby determining a touch area comprising a plurality of subpixels where the touch event is detected; if a touch event is detected, the array substrate is configured to display an inserted image with equal illuminance level for each pixel; the method further comprising providing a plurality of second scan signals to the plurality of first scan lines in each frame of inserted image; each first scan line in each frame of inserted image applies a second scan signal to each subpixel in the row of subpixels to allow a second data signal be passed from a corresponding data line to the each subpixel to produce a subpixel of image based on the second data signal so that a substantially same illuminance level for each pixel is produced; and providing a plurality of control voltage signal to the plurality of second scan lines in each frame of inserted image; providing a plurality of common voltage signals to a plurality of signal lines in each frame of inserted image; each second scan line in each frame of inserted image applies a control voltage signal to each photoresistor in the row of subpixels in the touch area and each signal line in each frame of inserted image applies a common voltage signal via the common voltage terminal to each photoresistor in the row of subpixels in the touch area, for detecting a biometric signal in each pixel unit in the touch area.

Optionally, each first scan line in each frame of inserted image applies the second scan signal to each third transistor in the row of subpixels for transmitting the biometric signal at the each pixel unit to a corresponding read line.

Optionally, the plurality of control voltage signals are provided in a range such that a difference between a first photocurrent change corresponding to a touching ridge line and a second photocurrent change corresponding to a touching valley line is substantially maximized.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
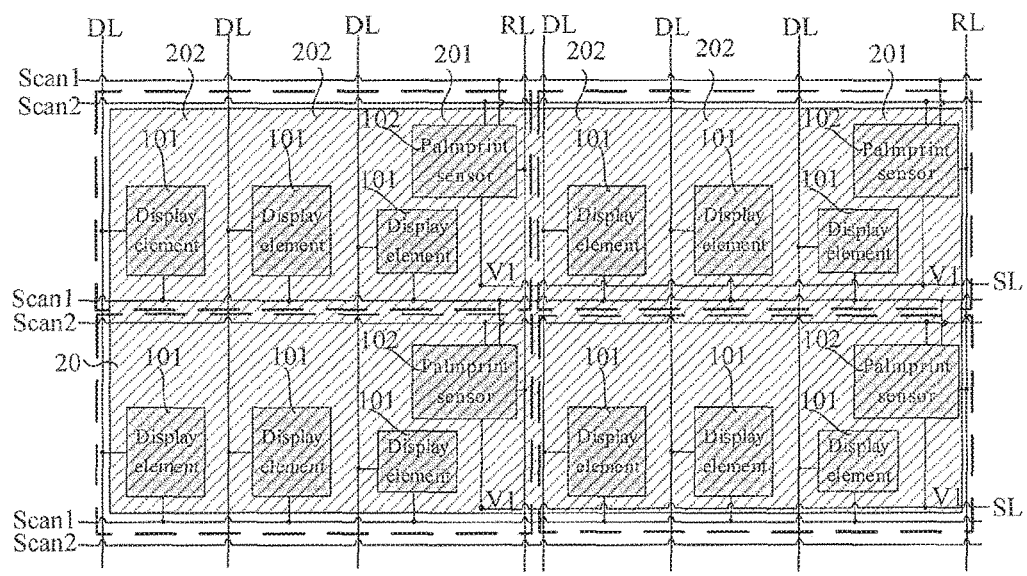
FIG. 1 is a diagram illustrating the structure of an array substrate in some embodiments.

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure provides a novel and superior array substrate that has both image display functionality and biometric information sensing functionality. A display apparatus having the present array substrate has greatly enhanced sensitivity in detecting biometric signals (e.g., fingerprint signals or palmprint signals) and accuracy in recognizing the biometric information (e.g., fingerprint information or palmprint information). As compared to the conventional apparatus, the present display apparatus has a much simplified structure and significantly improved function.

In some embodiments, the array substrate includes an array of a plurality of pixel units, each pixel unit comprising at least three subpixels for image display, at least one of which further comprising a semiconductor photodetector for detecting biometric information (e.g., fingerprint information or palmprint information) of at least a portion of a touching palm or finger or foot. Being image display subpixels, all subpixels in each pixel unit naturally includes a display element.

The semiconductor photodetector may be any appropriate type of photosensitive cell or phototransistor. Examples of appropriate semiconductor photodetector include, but are not limited to, a photoelectric cell, a photovoltaic cell, a photodiode, a PN photodiode, a PIN photodiode, and an avalanche photodiode.

In some embodiments, the semiconductor photodetector is configured to detect a difference between a first biometric signal change (e.g., a first photocurrent change) corresponding to a ridge line of a touching palm or finger or foot and a second biometric signal change (e.g., a first photocurrent change) corresponding to a valley line of a touching palm or finger or foot.

In some embodiments, the display element is a liquid crystal display element, and the subpixel of the present array substrate includes a subpixel of a liquid crystal display. For instance, a display panel or a display apparatus having the present array substrate may be a liquid crystal display panel or a liquid crystal display apparatus. Accordingly, the display element includes a thin film transistor, a pixel electrode, a common electrode, etc. The display panel having this type of display element typically also includes a liquid crystal layer, a packaging substrate opposite to the array substrate, and a backlight module as the light source for image display. Optionally, the backlight is a regular backlight suitable for liquid crystal display, e.g., a light guide plate in combination with a LED light bulb or light strip.

Optionally, the backlight for the liquid crystal display panel is an active matrix organic light emitting diode, each subpixel of the active matrix organic light emitting diode corresponding to each subpixel of the liquid crystal display in a one-to-one relationship. That is, the display panel is a combination of a liquid crystal display component and an active matrix organic light emitting diode backlight component. The liquid crystal display component controls the light emission in the display panel.

In some embodiments, the display element is a display element other than a liquid crystal display element. For instance, the display element is a self-emitting display element. Accordingly, a display panel having the type array substrate does not require a backlight. Optionally, the display element is an organic light emitting diode display element, and the subpixel of the array substrate is an organic light emitting diode subpixel. The organic light emitting diode subpixel may include a light emitting layer, a cathode, an anode, etc.

In some embodiments, the array substrate further includes a plurality of first scan lines and a plurality of data lines, each first scan line being connected to a row of subpixels, each data line being connected to a column of subpixels. Optionally, the plurality of first scan lines and the plurality of data lines cross over each other, defining the plurality of subpixels.

In some embodiments, the array substrate further includes a plurality of common voltage terminals, each common voltage terminal being connected to a semiconductor photodetector in a one-to-one relationship. Optionally, the array substrate further includes a plurality of signal lines, each of which is connected to each common voltage terminal in a row of pixel units for providing a common voltage signal to the semiconductor photodetector via the common voltage terminal. Optionally, the signal line is a common signal line.

In some embodiments, the array substrate further includes a plurality of read lines, each read line being connected to each semiconductor photodetector in a column of pixel units.

In some embodiments, the display element in each subpixel of the arrays substrate includes a first transistor. Optionally, the first transistor is a transistor for a liquid crystal display. Optionally, the first transistor is a transistor for an organic light emitting diode display.

In some embodiments, the display element is a liquid crystal display element, and the display element in each subpixel of the arrays substrate includes a first transistor and a pixel electrode. The first transistor includes a gate node, a first node and a second node. The gate node is connected to a corresponding first scan line, the first node is connected to a corresponding data line, and the second node is connected to the pixel electrode in the subpixel. Optionally, the first node is a source node and the second node is a drain node. Optionally, the display element further includes a common electrode. Optionally, the display element further includes a color filter.

In some embodiments, each semiconductor photodetector further includes a second transistor which is a phototransistor having a first node, a second node, and a light sensitive area. The light sensitive area is capable of generating a gate voltage to control a first node-second node current (e.g., a drain-source current). Optionally, the second transistor further includes a gate node. Examples of phototransistors suitable for the present array substrate include, but are not limited to, a field effect phototransistor and a bipolar phototransistor.

In some embodiments, the array substrate further includes a plurality of second scan lines. Each scan line is connected to a row of semiconductor photodetectors in a row of pixel units for providing a control voltage signal. Each semiconductor photodetector includes a second transistor. The second transistor is a phototransistor including a gate node connected to a corresponding second scan line for receiving the control voltage signal, and a first node connected to a corresponding common voltage terminal for receiving the common voltage signal.

In some embodiments, the second node of the second transistor is directly connected to a corresponding read line. For instance, each read line in the array substrate is connected to the second node of each second transistor in a column of pixel units. Optionally, the first scan lines, the second scan lines, and the signal lines of the present array substrate are configured to drive the pixel units on a row-by-row basis. As a result, in each time period a first scan signal is applied to a row of subpixels or in each time period a second scan signal and a common voltage signal is applied to the phototransistor in a row of subpixels, all other rows do not emit light and do not generate biometric signals. In other words, the phototransistors in all other rows have a negligible leak photocurrent. Accordingly, when the second node of the second transistor is directly connected to a corresponding read line, the read line can detect biometric signals generated from the row of subpixels being driven by a first scan line, the second scan line, and a signal line.

In some embodiments, each semiconductor photodetector includes a second transistor and a third transistor. The second transistor is a phototransistor having a first node, a second node, a gate node, and a light sensitive area. The third transistor (e.g., a switch transistor) includes a gate node, a first node, and a second node. In some embodiments, the third transistor is driven by the first scan line. The gate node of the third transistor is connected to a corresponding first scan line. In some embodiments, the third transistor is driven by a third scan line distinct from the first scan line. In that case, the array substrate further includes a plurality of third scan lines, each third scan line being connected to each semiconductor photodetector in a row of pixel units. Optionally, the second transistor includes a gate node connected to a corresponding second scan line for receiving the control voltage signal, a first node connected to a corresponding common voltage terminal for receiving the common voltage signal and a second node connected to a first node of the third transistor. The gate node of the third transistor is connected to a corresponding third scan line. The second node of the third transistor is connected to a corresponding read line.

In some embodiments, the array substrate further includes a plurality of touch electrodes and a plurality of touch signal lines, each touch electrode being connected to each touch signal line in a one-to-one relationship. Optionally, the plurality of touch electrodes are operated in a time-division mode. Optionally, the plurality of touch electrodes are used for conducting touch signals in the second time period, and for applying common voltage in the first time period. Optionally, at least one of the plurality of touch signal lines is used as a read line in biometric signal sensing mode (e.g., palmprint signal sensing mode). Optionally, at least one of the plurality of read line is used as a touch signal line in touch detection mode. Optionally, at least one of the plurality of touch signal lines is used as a read line in each frame of inserted image (biometric signal sensing mode), and used as a touch signal line in second time period of each frame of image (touch detection mode).

In some embodiments, the plurality of first scan lines, the plurality of second scan lines, and the plurality of signal lines are configured to drive the plurality of pixel units row-by-row. For instance, the semiconductor photodetector may be operated in a time-division driving mode for identifying a palmprint or fingerprint or footprint. The time-division driving mode includes a display mode in a first time period and a biometric signal sensing mode in a second time period. Optionally, each frame of image includes a first time period and a second time period. In the first time period, each first scan line is configured to apply a first scan signal to each subpixel in the row of subpixels, allowing a data signal be passed from a corresponding data line to the each subpixel to produce a subpixel of image based on the data signal. In the second time period, each second scan line is configured to apply a control voltage signal to each semiconductor photodetector in the row of subpixels and each signal line is configured to apply a common voltage signal via the common voltage terminal to each semiconductor photodetector in the row of subpixels, for detecting a biometric signal in each pixel unit. The second time period being later in time than the first time period.

Specifically, each first scan line in a first time period is configured to apply a first scan signal to each subpixel in the row of subpixels to switch on a corresponding first transistor, allowing a data signal be passed from a corresponding data line to a corresponding pixel electrode to produce a subpixel of image based on the data signal. In the second time period, each second scan line is configured to apply a control voltage signal to each photoresistor in the row of subpixels and each signal line in the second time period is configured to apply a common voltage signal via the common voltage terminal to each phototransistor in the row of subpixels for detecting a biometric signal in each pixel unit. The second time period being later in time than the first time period.

In some embodiments, the array substrate further includes a plurality of third scan lines. Optionally, the plurality of first scan lines, the plurality of second scan lines, the plurality of signal lines, and the plurality of third scan lines are configured to drive the plurality of pixel units row-by-row. For instance, the semiconductor photodetector may be operated in a time-division driving mode for identifying a palmprint or fingerprint or footprint. The time-division driving mode includes a display mode in a first time period and a biometric signal sensing mode in a second time period. Optionally, each frame of image includes a first time period and a second time period. In the first time period, each first scan line is configured to apply a first scan signal to each subpixel in the row of subpixels, allowing a data signal be passed from a corresponding data line to the each subpixel to produce a subpixel of image based on the data signal. In the second time period, each second scan line is configured to apply a control voltage signal to each semiconductor photodetector in the row of subpixels, each signal line is configured to apply a common voltage signal via the common voltage terminal to each semiconductor photodetector in the row of subpixels for detecting a biometric signal in each pixel unit; and each third scan line in the second time period applies a third scan signal to the each semiconductor photodetector in the row of subpixels to transmit the biometric signal at the each pixel unit to a corresponding read line. The second time period being later in time than the first time period.

Specifically, each first scan line in a first time period of each frame of image is configured to apply a first scan signal to each subpixel in the row of subpixels to switch on a corresponding first transistor, allowing a data signal be passed from a corresponding data line to a corresponding pixel electrode to produce a subpixel of image based on the data signal. In the second time period, each second scan line is configured to apply a control voltage signal to each photoresistor in the row of subpixels, each signal line is configured to apply a common voltage signal via the common voltage terminal to each phototransistor in the row of subpixels for detecting a biometric signal in each pixel unit; and each third scan line in the second time period applies a third scan signal to switch on the third transistor in the row of subpixels for transmitting the biometric signal detected in each pixel unit to a corresponding read line. The second time period being later in time than the first time period.

In some embodiments, the array substrate includes a plurality of first scan lines, a plurality of second scan lines, and a plurality of signal lines, and the third transistor is driven by the first scan line. The gate node of the third transistor is connected to a corresponding first scan line. Optionally, the plurality of first scan lines, the plurality of second scan lines, and the plurality of signal lines are configured to drive the plurality of pixel units row-by-row. For instance, the semiconductor photodetector may be operated in a time-division driving mode for identifying a palmprint or fingerprint or footprint. The time-division driving mode includes a display mode in a first time period and a biometric signal sensing mode in a second time period. Optionally, each frame of image includes a first time period and a second time period. In the first time period, each first scan line is configured to apply a first scan signal to each subpixel in the row of subpixels, allowing a data signal be passed from a corresponding data line to the each subpixel to produce a subpixel of image based on the data signal. In the second time period, each first scan line is configured to apply a second scan signal to each subpixel in the row of subpixels to allow a second data signal be passed from a corresponding data line to the each subpixel to produce a subpixel of image based on the second data signal; each second scan line is configured to apply a control voltage signal to each semiconductor photodetector in the row of subpixels, and each signal line is configured to apply a common voltage signal via the common voltage terminal to each semiconductor photodetector in the row of subpixels, for detecting a biometric signal in each pixel unit. Optionally, a substantially same illuminance level for each pixel is produced. Optionally, the second data signal being equal for each subpixel. The second time period being later in time than the first time period.

In some embodiments, the array substrate further includes a plurality of touch electrodes and a plurality of touch signal lines. Each touch electrode is connected to each touch signal line in a one-to-one relationship. The gate node of the third transistor is connected to a corresponding first scan line. Optionally, the plurality of first scan lines, the plurality of second scan lines, and the plurality of signal lines are configured to drive the plurality of pixel units row-by-row. For instance, the semiconductor photodetector may be operated in a time-division driving mode for identifying a paimprint or fingerprint or footprint. The time-division driving mode includes a display mode in a first time period and a touch sensing mode in a second time period of a frame of image. The time-division driving mode may optionally further include a frame of inserted image if a touch event is detected. If no touch event is detected, the frame of image is repeated and the time-division driving mode does not include the frame of inserted image. In the first time period of each frame of image, each first scan line is configured to apply a first scan signal to each subpixel in the row of subpixels to allow a first data signal be passed from a corresponding data line to the each subpixel to produce a subpixel of image based on the first data signal. In the second time period of each frame of image, each touch signal line is configured to apply a touch signal to each touch electrode for detecting a touch event at each touch electrode thereby determining a touch area comprising a plurality of subpixels or pixels where the touch event is detected. If no touch event is detected, the frame of image is repeated. If a touch event is detected, the array substrate is configured to display an inserted image with equal illuminance level (e.g., grayscale level) for each pixel. In each frame of inserted image, each first scan line is configured to apply a second scan signal to each subpixel in the row of subpixels to allow a second data signal be passed from a corresponding data line to the each subpixel to produce a subpixel of image based on the second data signal; each second scan line is configured to apply a control voltage signal to each semiconductor photodetector in the row of subpixels in the touch area; and each signal line is configured to apply a common voltage signal via the common voltage terminal to each semiconductor photodetector in the row of subpixels in the touch area, for detecting a biometric signal in each pixel unit in the touch area. The second data signal is equal for each subpixel.

Optionally, the plurality of touch electrodes are used for conducting touch signals in the second time period, and for applying common voltage in the first time period. Optionally, at least one of the plurality of touch signal lines is used as a read line in each frame of inserted image (biometric signal sensing mode). Optionally, at least one of the plurality of read line is used as a touch signal line in second time period of each frame of image (touch detection mode). Optionally, at least one of the plurality of touch signal lines is used as a read line in each frame of inserted image (biometric signal sensing mode), and used as a touch signal line in second time period of each frame of image (touch detection mode).

Optionally, the control voltage signal is configured to be in a range such that a difference between a first photocurrent change corresponding to a touching ridge line (e.g., a touching palm ridge line or a touching finger ridge line) and a second photocurrent change corresponding to a touching valley line (e.g., a touching palm valley line or a touching finger valley line) is substantially maximized.

Optionally, each pixel unit comprises a red subpixel, a green subpixel, and a blue subpixel, wherein the blue subpixel includes the semiconductor photodetector.

In another aspect, the present disclosure provides a display panel having the array substrate described herein. Optionally, the display panel is a self-emitting type display panel such as an organic light emitting diode display panel. Optionally, the display panel is a liquid crystal display panel. Optionally, the display panel further includes a packaging substrate.

In some embodiments, the display panel includes a backlight module. Optionally, the backlight module includes a light guide plate and a light bulb or a LED light strip. Optionally, the backlight module includes a plurality of active matrix organic light emitting diode pixel units as the light source. Optionally, each active matrix organic light emitting diode pixel unit includes at least three active matrix organic light emitting diode subpixels, each active matrix organic light emitting diode subpixel corresponding to each subpixel of the array substrate in a one-to-one relationship.

In some embodiments, the display panel includes a liquid crystal type array substrate in combination with a backlight module having a plurality of active matrix organic light emitting diode pixel units as the light source. Each active matrix organic light emitting diode pixel unit includes at least three active matrix organic light emitting diode subpixels, each active matrix organic light emitting diode subpixel corresponding to each subpixel of the liquid crystal array substrate in a one-to-one relationship. The liquid crystal array substrate may further include other components necessary for the liquid crystal display, e.g., a pixel electrode and a common electrode. The display panel further includes a packaging substrate (e.g., a color filter substrate) and a liquid crystal layer between the array substrate and the packaging substrate. Optionally, the display panel further includes a color filter. Because this type of display panel utilizes an organic light emitting diode as the backlight (e.g., a RGB OLED), a color filter is not required in the array substrate or in the packaging substrate.

In some embodiments, the display panel further includes a signal processor for processing the biometric signal detected in the array substrate. For instance, the signal processor may include a plurality of amplifiers connected to the plurality of read lines in a one-to-one relationship for amplifying read line signals. Optionally, the signal processor further includes a plurality of differentiators for generating a differential value based on amplified read line signals derived from two read line signals of any two neighboring read lines. Each of the plurality of differentiators generates a differential value between amplified read line signals derived from two read line signals of any two neighboring read lines.

In another aspect, the present disclosure provides a method for driving an operation of the array substrate. For instance, the driving method may include a time-division driving mode for identifying a palmprint or fingerprint or footprint. The time-division driving mode includes a display mode in a first time period and a biometric signal sensing mode in a second time period. Optionally, each frame of image includes a first time period and a second time period. In the first time period, each first scan line applies a first scan signal to each subpixel in the row of subpixels, allowing a data signal be passed from a corresponding data line to the each subpixel to produce a subpixel of image based on the data signal. In the second time period, each second scan line applies a control voltage signal to each semiconductor photodetector in the row of subpixels, and each signal line applies a common voltage signal via the common voltage terminal to each semiconductor photodetector in the row of subpixels for detecting a biometric signal in each pixel unit. The second time period being later in time than the first time period.

In some embodiments, the method includes providing a plurality of first scan signals to the plurality of first scan lines row-by-row in a first time period of each frame of image; each first scan line in a first time period applies a first scan signal to each subpixel in the row of subpixels to allow a data signal be passed from a corresponding data line to the each subpixel to produce a subpixel of image based on the data signal; and providing a plurality of control voltage signals to the plurality of second scan lines row-by-row and providing a plurality of common voltage signals to the plurality of signal lines row-by-row in a second time period of each frame of image. Each second scan line in a second time period of each frame of image applies a control voltage signal to each semiconductor photodetector in the row of subpixels and each signal line in a second time period applies a common voltage signal via the common voltage terminal to each semiconductor photodetector in the row of subpixels for detecting a biometric signal in each pixel unit.

Specifically, each first scan line in the first time period applies the first scan signal to each subpixel in the row of subpixels to switch on a corresponding first transistor, allowing a data signal be passed from a corresponding data line to a corresponding pixel electrode to produce a subpixel of image based on the data signal. In the second time period, each second scan line applies a control voltage signal to each photoresistor in the row of subpixels, and each signal line applies a common voltage signal via the common voltage terminal to each phototransistor in the row of subpixels for detecting a biometric signal in each pixel unit. The second time period being later in time than the first time period.

In some embodiments, the driving method further includes providing a plurality of third scan signals to the plurality of third scan lines row-by-row in the second time period of each frame of image. Optionally, each third scan line in the second time period applies a third scan signal to the each semiconductor photodetector in the row of subpixels for transmitting the biometric signal at the each pixel unit to a corresponding read line. The second time period being later in time than the first time period.

Specifically, each first scan line in the first time period applies a first scan signal to each subpixel in the row of subpixels to switch on a corresponding first transistor, allowing a data signal be passed from a corresponding data line to a corresponding pixel electrode to produce a subpixel of image based on the data signal. In a second time period, each second scan line applies a control voltage signal to each photoresistor in the row of subpixels; each signal line applies a common voltage signal via the common voltage terminal to each phototransistor in the row of subpixels for detecting the biometric signal in each pixel unit; and each third scan line applies a third scan signal to switch on the third transistor in the row of subpixels for transmitting the biometric signal detected in the each pixel unit to a corresponding read line. The second time period being later in time than the first time period.

Optionally, the plurality of control voltage signals are provided in a range such that a difference between a first photocurrent change corresponding to a touching ridge line (e.g., a touching palm ridge line or a touching finger ridge line) and a second photocurrent change corresponding to a touching valley line (e.g., a touching palm valley line or a touching finger valley line) is substantially maximized.

In some embodiments, the driving method includes providing a plurality of first scan signals to the plurality of first scan lines row-by-row in a first time period of each frame of image; each first scan line in the first time period applies a first scan signal to each subpixel in the row of subpixels to allow a data signal be passed from a corresponding data line to the each subpixel to produce a subpixel of image based on the data signal; providing a plurality of second scan signals to the plurality of first scan lines in a second time period of each frame of image; each first scan line in each frame of inserted image applies a second scan signal to each subpixel in the row of subpixels to allow a second data signal be passed from a corresponding data line to the each subpixel to produce a subpixel of image based on the second data signal so that a substantially same illuminance level for each pixel is produced; and providing a plurality of control voltage signal to the plurality of second scan lines in the second time period; providing a plurality of common voltage signals to the plurality of signal lines in the second time period; each second scan line in the second time period applies a control voltage signal to each semiconductor photodetector in the row of subpixels and each signal line in each frame of inserted image applies a common voltage signal via the common voltage terminal to each semiconductor photodetector in the row of subpixels, for detecting a biometric signal in each pixel unit.

In some embodiments, the driving method includes providing a plurality of first scan signals to the plurality of first scan lines row-by-row in a first time period of each frame of image; each first scan line in the first time period applies a first scan signal to each subpixel in the row of subpixels to allow a data signal be passed from a corresponding data line to the each subpixel to produce a subpixel of image based on the data signal; and providing a plurality of touch signals to the plurality of touch electrodes in a second time period of each frame of image, each touch signal line in the second time period applies a touch signal to each touch electrode for detecting a touch event at each touch electrode thereby determining a touch area comprising a plurality of subpixels where the touch event is detected. If no touch event is detected, the frame of image is repeated. If a touch event is detected, the array substrate is configured to display an inserted image with equal illuminance level for each pixel. The driving method then further includes providing a plurality of second scan signals to the plurality of first scan lines in each frame of inserted image; each first scan line in each frame of inserted image applies a second scan signal to each subpixel in the row of subpixels to allow a second data signal be passed from a corresponding data line to the each subpixel to produce a subpixel of image based on the second data signal so that a substantially same illuminance level for each pixel is produced; and providing a plurality of control voltage signal to the plurality of second scan lines in each frame of inserted image; providing a plurality of common voltage signals to the plurality of signal lines in each frame of inserted image; each second scan line in each frame of inserted image applies a control voltage signal to each semiconductor photodetector in the row of subpixels in the touch area and each signal line in each frame of inserted image applies a common voltage signal via the common voltage terminal to each semiconductor photodetector in the row of subpixels in the touch area, for detecting a biometric signal in each pixel unit in the touch area.

Figure 2:
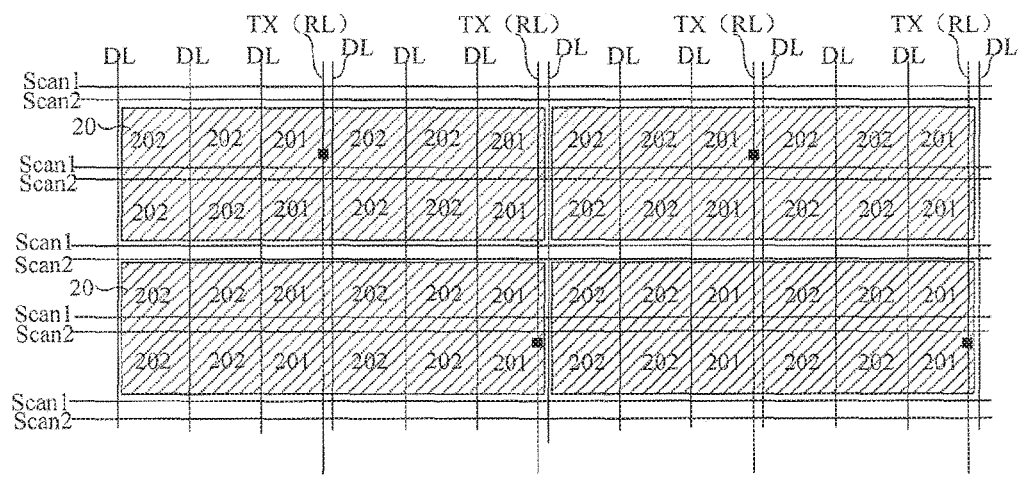
FIG. 2 is a diagram illustrating the structure of an array substrate in some embodiments.

FIG. 1 is a diagram illustrating the structure of an array substrate in some embodiments. FIG. 2 is a diagram illustrating the structure of an array substrate in some embodiments. Referring to FIG. 1 and FIG. 2, the array substrate in the embodiment includes an array of a plurality of pixel units arranged in a matrix of multiple rows and columns. Each pixel unit (marked as a dashed box frame) includes at least three subpixels. Each subpixel (201 or 202) includes a display element 101 and at least one subpixel 201 of each pixel unit also includes a semiconductor photodetector 102. The array substrate further includes a plurality of touch electrodes 20 (shadowed portion in FIG. 1, and FIG. 2) and a plurality of touch signal lines TX. Each touch electrode 20 is connected to each touch signal line TX in a one-to-one relationship. Referring to FIG. 2, the black square shaped dots represent vias for connecting a touch electrode 20 and a touch signal line TX.

Referring to FIG. 1, each pixel unit in the embodiment includes only one subpixel 201 having both a semiconductor photodetector 102 and a display element 101, and the other two subpixels 202 in the same pixel unit having no semiconductor photodetector 102 but only a display element 101. Optionally, each pixel unit can have more than one subpixels 201 that contain a semiconductor photodetector 102. For example, each pixel unit may have two subpixels 201 each having a semiconductor photodetector 102. Optionally, each of three subpixels in a pixel unit includes a semiconductor photodetector 102. Optionally, every subpixel in a pixel unit includes a semiconductor photodetector 102.

Referring to FIG. 1A, the display element 101 of each subpixel is connected to a first scan line Scan1 and a data line DL. Optionally, the first scan line Scan1 is along a row direction of the array substrate and the data line DL is along a column direction. In some embodiments, the display element can be configured into an On-state or Off-state by a first scan signal loaded from the first scan line Scan1. The display element 101 receives a data signal from the data line DL when the display element 101 is set at an On-state for producing a subpixel of image. On the other hand, the Off-state corresponds to no image display. Optionally, the display elements 101 in each row of the array are commonly connected to a single first scan line Scan1, and the display elements 101 in each column of the array are commonly connected to a single data line DL.

In some embodiments, the semiconductor photodetector 102 is connected to a first scan line Scan1, a second scan line Scan2, a common voltage terminal V1, and a read line RL (see FIG. 1). Optionally, the second scan line Scan2 is along the row direction and the read line RL is along the column direction. In some embodiments, the semiconductor photodetector 102 is driven by a control voltage signal form a corresponding second scan line Scan2 and a common voltage signal from a corresponding common voltage terminal V1 for detecting a biometric signal. Optionally, the semiconductor photodetector 102 is driven by a second scan signal from the first scan line Scan1 to transmit the detected biometric signal to the read line RL. Optionally, the semiconductor photodetectors 102 in each row of the array are commonly connected to a single first scan line Scan1, the semiconductor photodetectors 102 in each row of the array are commonly connected to a single second scan line Scan2, and the semiconductor photodetectors 102 in each column of the array are commonly connected to a single read line RL.

In some embodiments, the semiconductor photodetector 102 is connected to a second scan line Scan2, a third scan line, a common voltage terminal V1, and a read line RL. That is, the array substrate further includes a plurality of third scan lines. Each third scan line is connected to each semiconductor photodetector in a row of pixel units. Optionally, the semiconductor photodetector 102 is driven by a third scan signal from the third scan line to transmit the detected biometric signal to the read line RL. Optionally, the semiconductor photodetectors 102 in each row of the array are commonly connected to a single second scan line Scan2, the semiconductor photodetectors 102 in each row of the array are commonly connected to a single third scan line, and the semiconductor photodetectors 102 in each column of the array are commonly connected to a single read line RL.

In some embodiments, all voltage control terminals V1 corresponding to each row of semiconductor photodetectors 102 are commonly connected to a single signal line SL. The single signal line SL provides a common voltage signal for each common voltage terminal V1. This design reduces numbers of metal lines on the array substrate thereby enhances aperture ratio for image display.

In some embodiments, the biometric signals collected by the semiconductor photodetector 102 include information derived from both valley lines and ridge lines of a palm or a finger or a foot.

In the present array substrate, the first scan line Scan1 is configured to provide a first scan signal to the display element 101 in each subpixel in the row of subpixels, allowing a data signal to be passed from a corresponding data line DL to the display element 101. In this mode, the array substrate performs its image display function. In biometric signal sensing mode, the second scan line Scan2 is configured to provide a control voltage signal, and the common voltage terminal V1 is configured to provide a common voltage signal, to drive the corresponding semiconductor photodetector 102 for detecting a biometric signal. By using the second scan lines Scan2 for providing control voltage signals having an appropriate value, a difference between a first photocurrent change corresponding to a touching ridge line (e.g., a touching palm ridge line or a touching finger ridge line) and a second photocurrent change corresponding to a touching valley line (e.g., a touching palm valley line or a touching finger valley line) can be substantially maximized. A display apparatus having the present array substrate contains integrated semiconductor photodetectors 102, thus can perform both image display function and biometric recognition function (e.g., palmprint recognition function or fingerprint recognition function). As a biometric information detection and recognition device, the display apparatus having the present array substrate has greatly enhanced sensitivity in detecting biometric signals (e.g., fingerprint signals or palmprint signals) and accuracy in recognizing the biometric information (e.g., fingerprint information or palmprint information). As compared to the conventional apparatus, the present display apparatus has a much simplified structure and significantly improved function.

Referring to FIG. 2, optionally, at least one of the plurality of touch signal lines TX is used as a read line RL in biometric signal sensing mode. Optionally, at least one of the plurality of read line RL is used as a touch signal line TX in touch detection mode. Optionally, at least one of the plurality of touch signal lines TX (e.g., the first TX line, the third TX line, the fifth TX line, etc. in an array substrate) is used as a read line RL in biometric signal sensing mode, and used as a touch signal line in touch detection mode. This design reduces numbers of metal lines on the array substrate thereby enhances aperture ratio for image display.

Figure 3A:
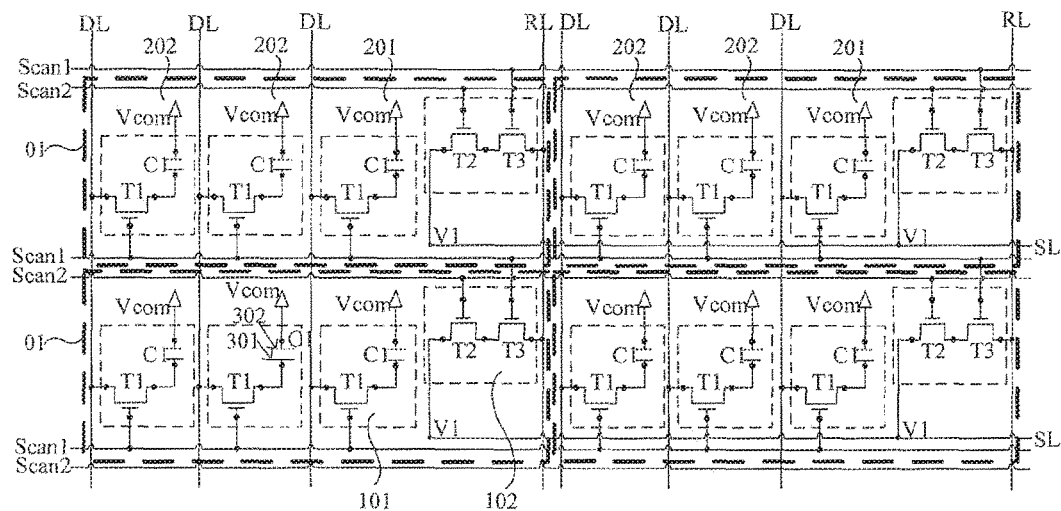
FIG. 3A is a diagram illustrating the circuits of an array substrate in some embodiments.

FIG. 3A is a diagram illustrating the circuits of an array substrate in some embodiments. Referring to FIG. 3A, the display element 101 in the embodiment includes a first transistor T1 and a pixel electrode 301. The first transistor T1 has a gate node, a first node, and a second node. The gate node is connected to the first scan line Scan1 next to the display element 101. The first node is connected to a data line DL corresponding to the subpixel containing the display element 101. The second node is connected to the pixel electrode 1011.

Referring to FIG. 3A, the common electrode 302 can be directly formed in the array substrate as part of the display element 101 in each subpixel of each pixel unit of the array substrate. Optionally, the common electrode 302 can be formed in a package substrate (e.g., a color filter substrate) opposing to the array substrate for forming a display panel or a display apparatus in general. The pixel electrode 301 forms a first capacitor C1 with the common electrode 302. The common electrode is electrically connected to a common voltage node Vcom.

Referring to FIG. 3A, each semiconductor photodetector 102 includes a second transistor T2 and a third transistor T3. In particular, the second transistor T2 is a phototransistor including a gate node, a first node, and a second node. The third transistor T3 (e.g., a regular three-terminal switch transistor) also includes a gate node, a first node, and a second node. The gate node of the second transistor T2 is connected to a corresponding second scan line Scan2. Each second scan line Scan2 is connected to a row of second transistors T2 for providing a control voltage signal to the gate nodes of the row of second transistors T2. The first node of T2 is connected to the common voltage terminal V1 associated with the semiconductor photodetector 102. The second node of T2 is connected to the first node of T3. The gate node of T3 is connected to a corresponding first scan line Scan1 and the second node of T3 is connected to a corresponding read line RL next to the semiconductor photodetector 102.

As shown in FIG. 3A, the array substrate includes a plurality of signal lines SL, each signal line SL is connected to a row of common voltage terminals V1 in a row of pixel units. Thus, a row of semiconductor photodetectors 102 are connected to a same signal line SL through the corresponding common voltage terminals V1. The signal line SL provides common voltage signals to the common voltage terminals V1.

The semiconductor photodetector 102 described herein is capable of identifying various palmprints or fingerprints or footprints based on light refraction and reflection principle. When a palm (or a portion of a palm) or finger or foot touches the surface of a display panel having the present array substrate, light emitted from each subpixel irradiates on the valley lines and ridge lines of the palm, partly refracts and partly reflects back to the subpixel, and irradiate on the phototransistor T2 of the semiconductor photodetector 102. The refractive angle and reflection intensity of the light refracted and reflected from the valley lines are different from those of the light refracted and reflected from the ridge lines. This results in different photo-currents produced in the phototransistor T2 corresponding to the valley lines and the phototransistor T2 corresponding to the ridge lines when the refracted and reflected light irradiates on the phototransistors T2. The photo-currents are transmitted to a signal processor through the corresponding read lines RL. Based on these photo-currents, the signal processor is able to process the detected biometric signals from the read lines, and recognize the valley lines and ridge lines in the palmprint or fingerprint or footprint.

For example, when a palm (or a finger or a foot) touches a pixel region of the array substrate containing a semiconductor photodetector 102 in at least one subpixel, the ridge lines of the palmprint (or fingerprint or footprint) is more likely in physical contact with the screen surface where the total reflection condition is changed locally upon touch, leading to the disruption of the total reflection locally. The disruption of the total reflection results in a reduced intensity of the light reflected by a ridge line of the palmprint (or fingerprint or footprint) back to the subpixel. On the other hand, the light reached any valley line of the palmprint (or fingerprint or footprint) substantially reflects back to the subpixel. This results in a light intensity difference between the light irradiating on the phototransistor T2 corresponding to the ridge lines and the light irradiating on the phototransistor T2 corresponding to the valley lines, which in turn leads to a difference between the photo-currents generated in the phototransistors T2 corresponding to the ridge lines and the valley lines.

In some embodiments, the control voltage signals are provided from the second scan lines Scan2 in a range such that a difference between a first photo-current in a first phototransistor due to a touching ridge line (e.g., a touching palm ridge line or a touching finger ridge line) and a second photo-current in a second phototransistor due to a touching valley line (e.g., a touching palm valley line or a touching finger valley line) is substantially maximized. That is, the gate node voltage of the phototransistors in the semiconductor photodetector 102 can be controlled in a certain range or a certain value to optimize its photo-sensitivity. As a result, a difference between a photo-current in response to a light reflected from a ridge line touching the display panel and a photo-current in response to a light reflected from a valley line touching the display panel is optimized or maximized.

Various appropriate phototransistors may be used for making the present array substrate. Examples of phototransistors include, but are not limited to, bipolar phototransistors and field effect phototransistors. In some embodiments, the phototransistor T2 is a field-effect phototransistor. Optionally, a common voltage signal is provided to the first node of the field-effect phototransistor through the common voltage terminal V1. Optionally, a control voltage signal is provided to the gate node of the field-effect phototransistor. Different control voltage signals result in different photo-sensitivity of the phototransistor T2, and generate different photo-currents that pass through corresponding drain-source nodes. Thus, the control voltage signal can be set in a certain range or a certain value to control a gate-drain field strength for optimizing the photo sensitivity of the phototransistor T2 in the semiconductor photodetector 102, enhancing a photo-current induced by a light irradiated on the phototransistor, and maximizing the photo-current difference between a photo-current in response to a light reflected from a ridge line touching the display panel and a photo-current in response to a light reflected from a valley line touching the display panel. Thus, the present array substrate is intrinsically capable of facilitating detection of biometric signals with clear identification of ridge lines and valley lines in a palmprint or a fingerprint or a footprint.

Optionally, the semiconductor photodetector 102 may include multiple switch transistors connected in parallel to the third transistor T3. Optionally, the semiconductor photodetector 102 may also include multiple phototransistors connected in parallel to the second transistor T2. Any of the transistors may be a transistor selected from an N-type transistor and a P-type transistor. Polycrystalline silicone transistor has a relatively small leak current. Optionally, the transistors (e.g., the second transistor T2 and the third transistor T3) are polycrystalline transistors.

Figure 4:
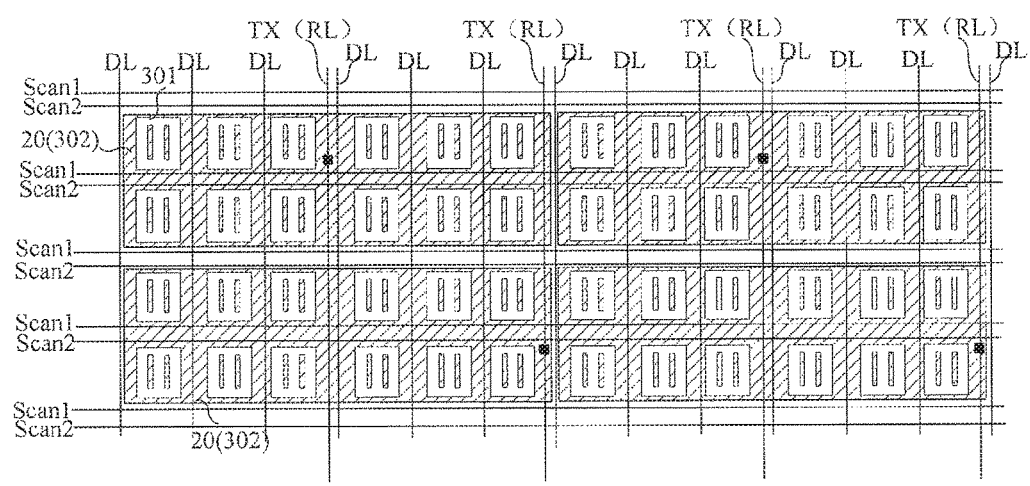
FIG. 4 is a diagram illustrating the structure of an array substrate in some embodiments.

FIG. 4 is a diagram illustrating the structure of an array substrate in some embodiments. Referring to FIG. 4, the plurality of touch electrodes 20 are operated in a time-division mode. In display mode, the plurality of touch signal lines TX transmit common voltage signals to the plurality of touch electrodes 20. In touch detection mode, the plurality of touch signal lines TX transmit touch signals to the plurality of touch electrodes 20. This design simplifies the manufacturing process of the array substrate.

Figure 3B:
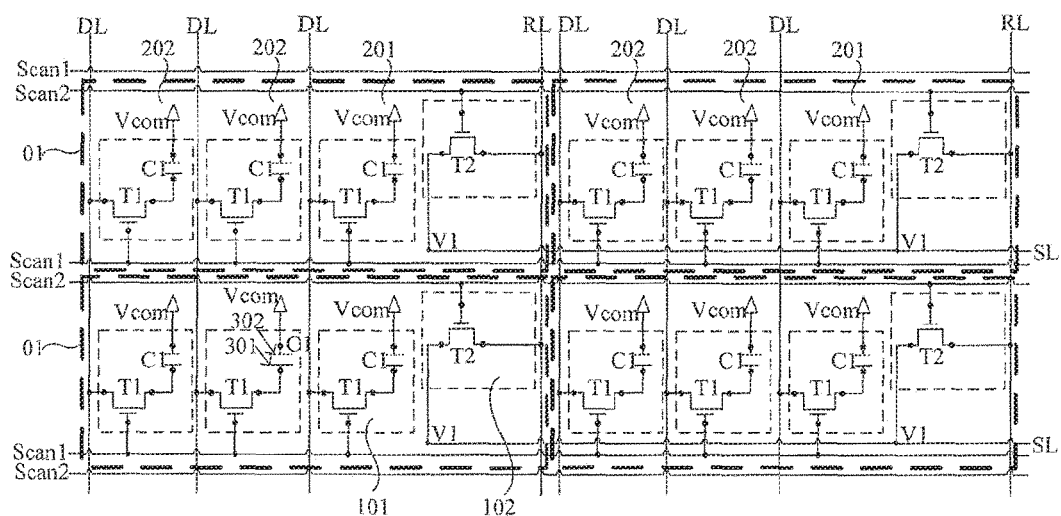
FIG. 3B is a diagram illustrating the circuits of an array substrate in some embodiments.

FIG. 3B is a diagram illustrating the circuits of an array substrate in some embodiments. Referring to FIG. 3B, the array substrate in the embodiment differs from that of FIG. 3A at least in that the semiconductor photodetector 102 includes a second transistor T2 (e.g., a phototransistor) but not a third transistor T3 (e.g., a switch transistor). Because the second transistor T2 is directly connected to the read line RL, a switch transistor is not required.

Specifically, the display element 101 in the embodiment includes a first transistor T1 and a pixel electrode 301. The first transistor T1 has a gate node, a first node, and a second node. The gate node is connected to the first scan line Scan1 next to the display element 101. The first node is connected to a data line DL corresponding to the subpixel containing the display element 101. The second node is connected to the pixel electrode 301.

Referring to FIG. 3B, the common electrode 302 can be directly formed in the array substrate as part of the display element 101 in each subpixel of each pixel unit of the array substrate. Optionally, the common electrode 302 can be formed in a package substrate (e.g., a color filter substrate) opposing to the array substrate for forming a display panel or a display apparatus in general. The pixel electrode 301 forms a first capacitor C1 with the common electrode 302. The common electrode is electrically connected to a common voltage node Vcom.

Referring to FIG. 3B, each semiconductor photodetector 102 includes a second transistor T2. In particular, the second transistor T2 is a phototransistor including a gate node, a first node, and a second node. The gate node of the second transistor T2 is connected to a corresponding second scan line Scan2. Each second scan line Scan2 is connected to a row of second transistors T2 for providing a control voltage signal to the gate nodes of the row of second transistors T2. The first node of T2 is connected to the common voltage terminal V1 associated with the semiconductor photodetector 102. The second node of T2 is directly connected to a corresponding read line RL next to the semiconductor photodetector 102.

As shown in FIG. 3B, the array substrate includes a plurality of signal lines SL, each signal line SL is connected to a row of common voltage terminals V1 in a row of pixel units. Thus, a row of semiconductor photodetectors 102 are connected to a same signal line SL through the corresponding common voltage terminals V1. The signal line SL provides common voltage signals to the common voltage terminals V1.

Various embodiments may be practiced to design the array substrate. Optionally, the number of semiconductor photodetectors 102 in each pixel units may be determined based on the nominal distance between a valley line and a neighboring valley line, the nominal distance between a ridge line and a neighboring ridge line, and the size of the pixel unit. For instance, the typical palmprint ridge spacing is greater than 100 µm and the typical valley spacing is larger than the ridge spacing, and the typical pixel size of the array substrate is in the range of 50-90 µm. Thus, the typical pixel size is relatively smaller than the distance between a valley line and a ridge line of a palmprint. Optionally, each pixel unit of an array substrate includes only one subpixel 201 having a semiconductor photodetector 102. Optionally, each pixel unit of an array substrate includes two subpixels 201 each having a semiconductor photodetector 102.

Among the red, green, and blue light, the blue light is the one least affected by external environment. In some embodiments, the subpixel 201 is a blue subpixel. Optionally, only the blue light subpixel in each pixel unit is selected to be a subpixel 201 including both a display element 101 and a semiconductor photodetector 102 for biometric information identification, whereas the red light pixel and the green light subpixel in each pixel unit are subpixels 202 including only a display element 101 but not a semiconductor photodetector 102. In some embodiments, each subpixel of color (e.g., the red, green, or blue subpixel) is associated with a corresponding color filter layer. Optionally, the color filters are disposed within the subpixels in the array substrate. Optionally, the color filters are disposed on a color filter substrate that is used for packaging with the array substrate to form a final display panel. The color filters are disposed at positions corresponding to subpixels in the color filter substrate.

Figure 5:
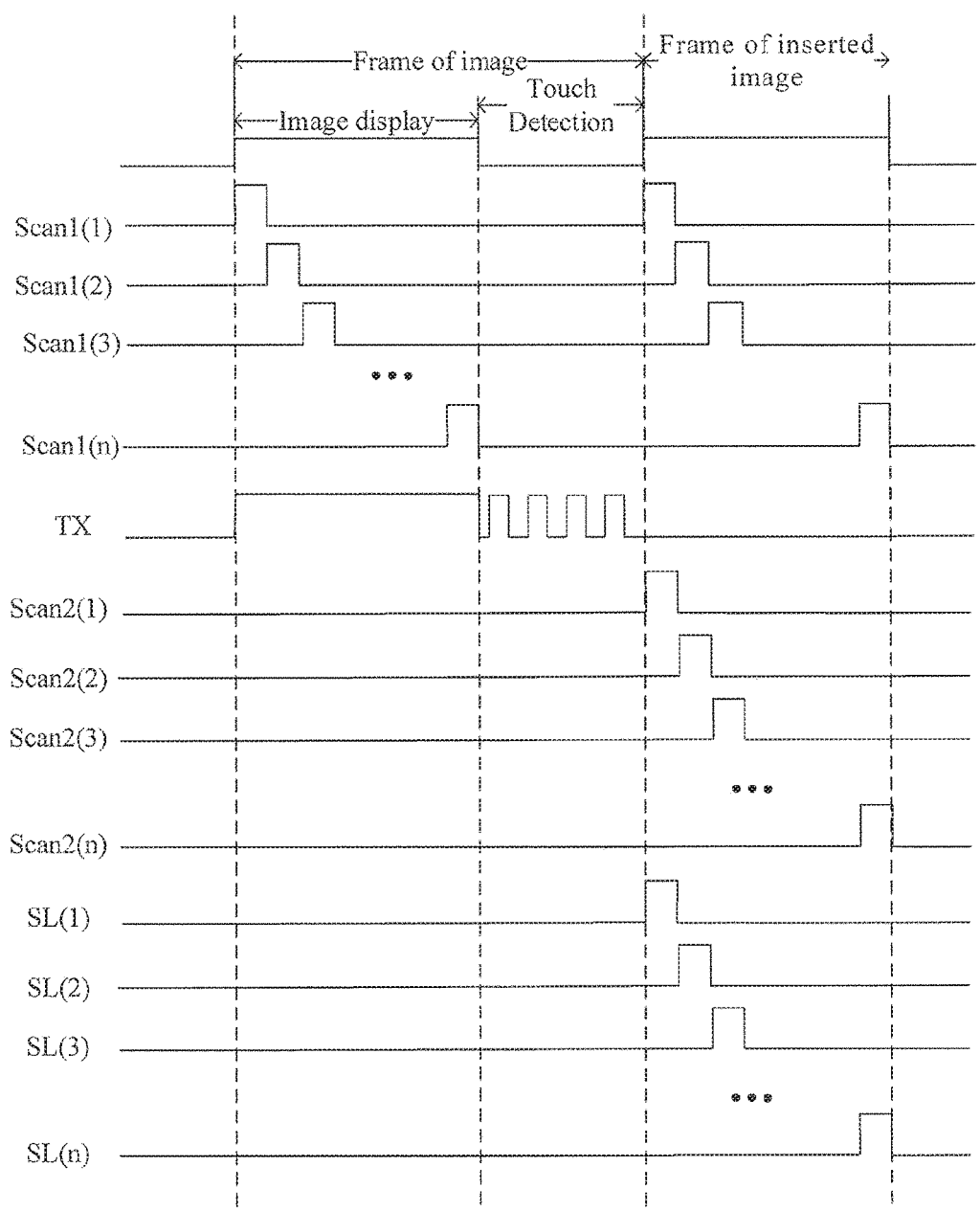
FIG. 5 is a diagram illustrating the time-division driving mode of an array substrate in some embodiments.

FIG. 5 is a diagram illustrating the time-division driving mode of an array substrate in some embodiments. Referring to FIG. 5, the first scan signal for driving subpixels, the touch signal for driving touch electrodes, and the second scan signal for driving semiconductor photodetector are operated in a sequential order on row-by-row basis for detecting biometric signals. FIG. 5 describes a driving method for operating an array substrate as shown in FIG. 3A for detecting biometric signals. All transistors in FIG. 3A are N-type transistor.

Referring to FIG. 5, if no touch event is detected, the array substrate is configured to display a frame of image in a repeated fashion. Each frame if image includes a first time period ("Image Display") and a second time period ("Touch detection"). In a first time period, the driving method is implemented by providing a plurality of first scan signals to a plurality of first scan lines Scan1 sequentially on row-by-row basis. The first scan signal is sent to each gate node of each first transistor T1 of each display element 101 in the corresponding row of pixel units to make the first transistor T1 in a conduction state between its first node and second node. A first data signal inputted from each data line (which crosses over each first scan line) charges the pixel electrode of each first capacitor C1 to generate a voltage signal between the pixel electrode and a common electrode for all subpixels. This voltage signal drives the liquid crystal (disposed at least in final display panel that is packaged with the array substrate) deflection to display a pixel of image. The same operation described above is repeated row-by-row (e.g., from the first row to the last row) to drive a plurality of first scan lines, a complete image can be displayed.

Referring to FIG. 5, in a second time period ("Touch detection") that is later in time than the first time period ("Image display"), the driving method is implemented by providing a plurality of touch signals to the plurality of touch electrodes in a second time period of each frame of image. Each touch signal line in the second time period applies a touch signal to each touch electrode for detecting a touch event at each touch electrode. Based on the touch detection, a touch area including a plurality of subpixels where the touch event is detected can be determined. In no touch event is detected, the array substrate is configured to repeat the display of the frame of image.

If a touch event is detected, the array substrate is configured to display an inserted image with equal illuminance level for each pixel. The driving method is further implemented by providing a plurality of second scan signals to the plurality of first scan lines sequentially on row-by-row basis in each frame of inserted image. The second scan signal is sent to each gate node of each first transistor T1 of each display element 101 in the corresponding row of pixel units to make the first transistor T1 in a conduction state between its first node and second node. A second data signal inputted from each data line (which crosses over each first scan line) charges the pixel electrode of each first capacitor C1 to generate a voltage signal between the pixel electrode and a common electrode for all subpixels. This voltage signal drives the liquid crystal (disposed at least in final display panel that is packaged with the array substrate) deflection to display a pixel of image. The second data signal is equal for each subpixel.

In some embodiments, the driving method is implemented by providing a plurality of control voltage signal to the plurality of second scan lines in each frame of inserted image; and providing a plurality of common voltage signals to the plurality of signal lines in each frame of inserted image, for example, sequentially on row-by-row basis. The control voltage signal is transmitted to each gate node of each second transistor T2. Optionally, the control voltage signals and the common voltage signals are only provided to gate nodes of second transistors T2. Thus, each second scan line in each frame of inserted image applies a control voltage signal to each semiconductor photodetector in the row of subpixels in the touch area and each signal line in each frame of inserted image applies a common voltage signal via the common voltage terminal to each semiconductor photodetector in the row of subpixels in the touch area, for detecting a biometric signal in each pixel unit in the touch area. As a palm (or a portion of a palm or a finger or a foot) is in touch with a region of a touch-screen associated with the array substrate, each semiconductor photodetector 102 within the touch area is able to sense an intensity change of a light reflected from the surface of the touch screen back to the subpixel, e.g., a light reflected from a region corresponding to a ridge line of a palmprint or a light reflected from a region corresponding to a valley line of the palmprint on the touch screen. Under the control of the control voltage and the common voltage, each second transistor (a phototransistor) T2 can be activated to generate a responsive photocurrent from the light irradiation of the reflected light (e.g., the light reflected from either a ridge line region or the light reflected from a valley line region on touch-screen). The light reflected from a ridge line region has a relatively weaker intensity as compared to that of the light reflected from a valley line region. Consequentially, the photo-current induced by the light reflected from a ridge line region is relatively smaller as compared to the photo-current induced by the light reflected from a valley line region on touch-screen.

Because the gate node of each T3 is also connected to the first scan line Scan1, the second scan signal provided to the first scan line Scan1 is also transmitted to each gate node of each third transistor T3 in each frame of inserted image, making the third transistor T3 in a conduction state between its first node and second node. The second transistor T2 is connected to the third transistor T3 that has been in conduction state, each photo-current signal generated by the phototransistor T2 directly passes through (and amplified by) T3, and is transmitted to a corresponding read line RL (which crosses over each first scan line) connected to each corresponding semiconductor photodetector as a biometric signal.

In some embodiments, the plurality of signal lines SL can be connected to a pin of an integrated circuit board. From the pin, the common voltage signal can be supplied to each signal line SL. Optionally, the common voltage signal is a fixed voltage signal. Optionally, the common voltage is a pulse voltage signal. In some embodiments, the common voltage signal is designed, depending on specific applications, to control the phototransistor to generate responsive photo-current change when the light irradiation intensity changes. In particular, it is desired to set the common voltage signal in a certain range to achieve optimum photo-sensitivity to generate a maximized difference between the photo-current induced by the light reflected from a ridge line region is relatively smaller as compared to the photo-current induced by the light reflected from a valley line region on touch-screen.

Referring to FIG. 5, the same operation described above is repeated row-by-row (e.g., from the first row to the last row). The plurality of semiconductor photodetectors 102 in a two-dimensional region of the touch area detect a collection of a plurality of biometric signals corresponding to the two-dimensional region of the touch area. By limiting the detection of biometric information (e.g., fingerprint information or palmprint information) to the touch area instead of the entire array substrate, the process may be made much faster. Each of the biometric signals is associated with a corresponding location information defined by each pixel unit location. The plurality of biometric signals and the location information correspond to a plurality of photo-current signals. As discussed above, a relatively weak photo-current signal corresponds to a ridge line region, whereas a relatively strong photo-current signal corresponds to a valley line region. Thus, the biometric signals associated with relatively weak photo-current signals correspond to ridge lines in a palm (or a finger or a foot), and the biometric signals associated with relatively strong photo-current signals correspond to valley lines in a palm (or a finger or a foot). The biometric information (e.g., fingerprint information or palmprint information) of the two-dimensional region in the touch area may be obtained by processing the plurality of biometric signals and identifying a plurality of ridge lines and valley lines.

For example, a first scan line Scan1 (or a second scan line Scan2) can be used to define an X-axis coordinate and a read line RL can be used to define a Y-axis coordinate for each subpixel 201 (containing a semiconductor photodetector 102) associated with the biometric information. Using this coordinate system, the biometric information can be linked to specific locations on the touch screen. Accordingly, the biometric information can be displayed at the corresponding positions on the screen, achieving biometric recognition.

In another aspect, the present disclosure provides a display panel having the array substrate described herein. Optionally, the display panel further includes a package substrate. Optionally, the display panel further includes a liquid crystal layers disposed between the array substrate and the package substrate.

Figure 6:
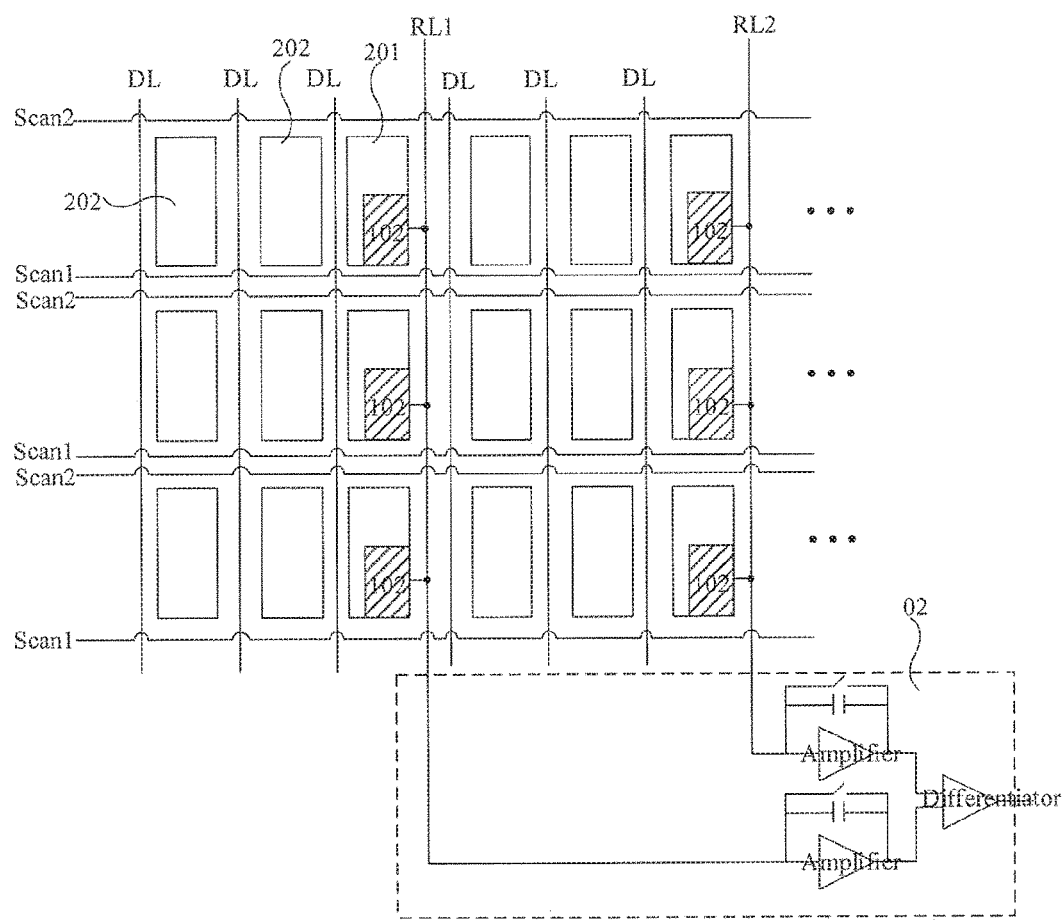
FIG. 6 is a diagram illustrating the structure of a display apparatus in some embodiments.

In another aspect, the present disclosure provides a display apparatus having the array substrate described herein. FIG. 6 is a diagram illustrating the structure of a display apparatus in some embodiments. Referring to FIG. 6, the display apparatus also includes a signal processor 02 connected to the plurality of read lines RL of the array substrate. The signal processor 02 is configured to receive all biometric signals outputted from the plurality of read lines RL, based on which all the biometric signals are processed for identifying the biometric information.

Referring to FIG. 6, the signal processor 02 is connected to at least a first read line RL1 linked to a first column of subpixels 201 containing semiconductor photodetectors 102 and a second read line RL2 linked to a second column of subpixels 201 containing semiconductor photodetectors 102. Optionally, the signal processor 02 includes a plurality of amplifiers and a plurality of differentiators. The plurality of amplifiers are connected to the plurality of read lines in a one-to-one relationship for amplifying read line signals. Each of the plurality of differentiators generates a differential value between amplified read line signals derived from two read line signals of any two neighboring read lines. For instance, as shown in FIG. 6, two signal amplifiers are respectively connected to two corresponding neighboring read line RL1 and RL2 and each has a corresponding output port. Each differentiator has two input ports respectively connected to the two output ports of the two signal amplifiers and has one output port for outputting a differential signal.

When a palm portion (or a finger or a foot) is in touch with the screen, the phototransistor T2 receives a reflected light from the touch screen, and generates a photo-current signal, which is then transmitted via a corresponding read line (for example RL1) to the signal processor 02, and subsequently amplified by a signal amplifier. Amplified read line signals derived from two read line signals of any two neighboring read lines are used as inputs for a differentiator for generating a differential value between amplified read line signals. For example, the differential value can be used for identification of ridge lines and valley lines. In some embodiments, the differential value has a first differential value corresponding to a scenario where two read line signals of two neighboring read lines correspond to one ridge line region and one valley line region. In some embodiments, the differential value has a second differential value corresponding to a scenario where two read line signals of two neighboring read lines correspond to two ridge line regions, or two valley line regions. Optionally, the first differential value is a positive value. In that case, the signal received from first one of the two read lines (e.g., RL1) is a biometric signal associated with reflection of a ridge line and another signal received from another one of the two read lines (e.g., RL2) is a biometric signal associated with reflection of a valley line. Optionally, the first differential value is a negative value. In that case, the signal received from first one of the two read lines (e.g., RL1) is a biometric signal associated with reflection of a valley line and another signal received from another one of the two read lines (e.g., RL2) is a biometric signal associated with reflection of a ridge line. Each read line has two neighboring red lines on two sides. For each read line, two differential values may be generated from amplified read line signals derived from two read line signals of any one of two pairs of neighboring read lines. By repeating the differentiation operation for multiple pairs of sequentially pairing read lines and analyzing the set of differential values as a whole, each biometric signal from a specific read line RL1 (or RL2) can be identified to be either from a valley line or ridge line without ambiguity.

Optionally, it is possible to define different grayscale levels for the palmprint (or fingerprint or footprint) based on different values of the outputted differential signals. Accordingly, the ridge lines and valley lines having corresponding grayscale levels may be displayed on screen.

Palmprint information generally includes the main lines, wrinkles, papillary pattern, and triangular minutiae points and so on. The main lines are the most prominent palm lines. Typically, there are three main lines for most human palms, which are so called the lifeline, emotion line, and intelligence line. Generally, wrinkles are shallower and thinner than the main lines, and mostly irregular. Papillary patterns are fingerprint-like patterns all over the palm. Triangular minutiae points are the center points of multiple triangle-shaped areas formed by the mastoid patterns on the palm. These triangle-shaped areas are located near the wrist below the middle finger and root area of each finger. All these biometric information can be illustrated by valley lines and ridge lines. Therefore, as the display apparatus detects a palmprint or fingerprint with clear identification of valley lines and ridge lines, the detail information as described above can be deduced and compared with stored biometric information in data base to achieve biometric recognition.

Figure 7:
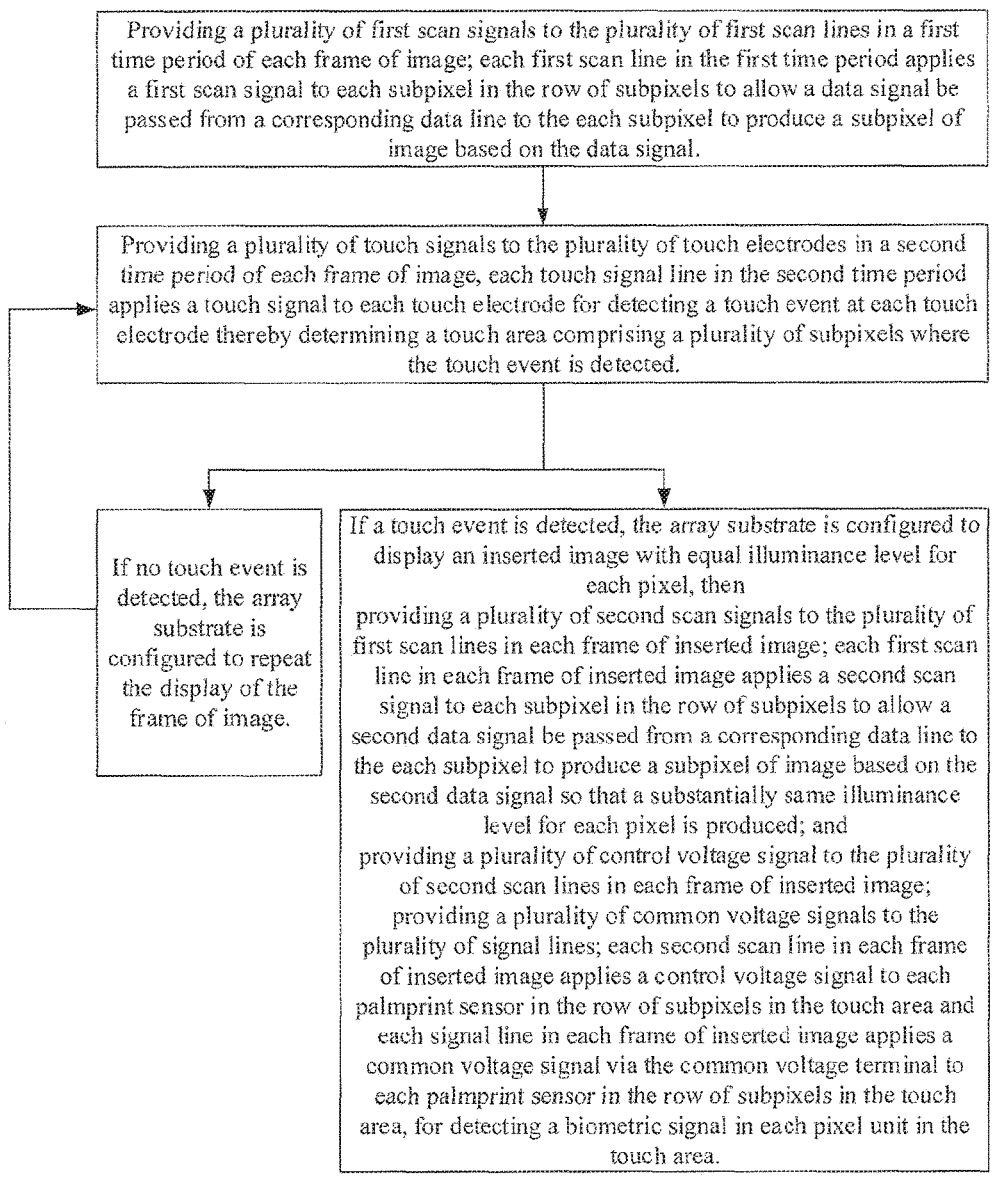
FIG. 7 is a flow chart illustrating a method for driving an operation of the array substrate in some embodiments.

FIG. 7 is a flow chart illustrating a method for driving an operation of the array substrate in some embodiments. Referring to FIG. 7, the method in the embodiment includes providing a plurality of first scan signals to the plurality of first scan lines row-by-row in a first time period of each frame of image; each first scan line in the first time period applies a first scan signal to each subpixel in the row of subpixels to allow a data signal be passed from a corresponding data line to the each subpixel to produce a subpixel of image based on the data signal; and providing a plurality of touch signals to the plurality of touch electrodes in a second time period of each frame of image, each touch signal line in the second time period applies a touch signal to each touch electrode for detecting a touch event at each touch electrode thereby determining a touch area comprising a plurality of subpixels where the touch event is detected. If no touch event is detected, the array substrate is configured to repeat the display of the frame of image. If a touch event is detected, the array substrate is configured to display an inserted image with equal illuminance level (e.g., grayscale level) for each pixel, and the method further includes providing a plurality of second scan signals to the plurality of first scan lines in each frame of inserted image; each first scan line in each frame of inserted image applies a second scan signal to each subpixel in the row of subpixels to allow a second data signal be passed from a corresponding data line to the each subpixel to produce a subpixel of image based on the second data signal so that a substantially same illuminance level for each pixel is produced; and providing a plurality of control voltage signal to the plurality of second scan lines in each frame of inserted image; providing a plurality of common voltage signals to the plurality of signal lines in each frame of inserted image; each second scan line in each frame of inserted image applies a control voltage signal to each semiconductor photodetector in the row of subpixels in the touch area and each signal line in each frame of inserted image applies a common voltage signal via the common voltage terminal to each semiconductor photodetector in the row of subpixels in the touch area, for detecting a biometric signal in each pixel unit in the touch area.

In some embodiments, the inserted image is an image having a high illuminance level (e.g., a high grayscale level). Optionally, the inserted image is a white image. Optionally, the inserted image is a red image. Optionally, the inserted image is a green image. Optionally, the inserted image is a blue image.

In the present driving method, the first scan line Scan1 is configured to provide a first scan signal to the display element 101 in each subpixel in the row of subpixels, allowing a data signal to be passed from a corresponding data line DL to the display element 101. In this mode, the array substrate performs its image display function. In touch detection mode of each frame of image, the touch signal line TX is configured to provide a touch signal to the touch electrode in each subpixel for detecting a touch event at each touch electrode. In biometric signal sensing mode in each frame of inserted image, the second scan line Scan2 is configured to provide a control voltage signal, and the common voltage terminal V1 is configured to provide a common voltage signal, to drive the corresponding semiconductor photodetector 102 for detecting a biometric signal. By using the second scan lines Scan2 for providing control voltage signals having an appropriate value, a difference between a first photocurrent change corresponding to a touching ridge line and a second photocurrent change corresponding to a touching valley line can be substantially maximized. A display apparatus having the present array substrate contains integrated semiconductor photodetectors 102, thus can perform both image display function and biometric recognition function. As a biometric signal detection and recognition device, the display apparatus having the present array substrate has greatly enhanced sensitivity in detecting biometric signals and accuracy in recognizing the biometric information. As compared to the conventional apparatus, the present display apparatus has a much simplified structure and significantly improved function.

In some embodiments, each display element 101 including a first transistor T1 and a pixel electrode 301. In the first time period of each frame of image ("Image display" mode), the driving method is implemented by loading a plurality of first scan signals to a plurality of first scan lines Scan1 sequentially on row-by-row basis. The first scan signal is sent to each gate node of each first transistor T1 of each display element 101 in the corresponding row of pixel units to make the first transistor T1 in a conduction state between its first node and second node. A data signal inputted from each data line (which crosses over each first scan line) charges the pixel electrode of each first capacitor C1 to generate a voltage signal between the pixel electrode and a common electrode for all subpixels. This voltage signal drives the liquid crystal (disposed at least in final display panel that is packaged with the array substrate) deflection to display a pixel of image. To avoid signal interference, optionally the first time period is a different time period from the second time period. For example, the second time period is later in time than the first time period. Optionally, the first time period and the second time period have different durations.

In some embodiments, each semiconductor photodetector 102 including a second transistor T2 and a third transistor T3. In biometric signal sensing mode in each frame of inserted image, the driving method is implemented by sending a control voltage signal to the gate electrode of the second transistor T2 through the second scan line Scan2 and sending a common voltage signal to the common voltage terminal V1 through a signal line SL that is associated with the row of pixel units currently in operation. The control voltage signal and the common voltage signal control the second transistor T2 to be in a conduction state between its first node and second node. When a palm (or a portion of a palm or a finger or a foot) is in touch with a region of a touch-screen associated with the array substrate, it may induce a photo-current change in the second transistor T2. In each frame of inserted image, the driving method also includes loading a plurality of second scan signals to a plurality of rows of first scan lines Scan1 sequentially on row-by-row basis. The second scan signal is transmitted to each gate node of each first transistor to allow a second data signal be passed from a corresponding data line to the each subpixel to produce a subpixel of image based on the second data signal so that a substantially same illuminance level for each pixel is produced. Simultaneously, the second scan signal is transmitted to each gate node of each third transistor T3 of each semiconductor photodetector 102 in the corresponding row of pixel units to make the third transistor T3 in a conduction state between its first node and second node. The second transistor T2 is connected to the third transistor T3 that has been in conduction state, each photo-current signal generated by the phototransistor T2 passes through (and amplified by) T3, and is transmitted as a biometric signal to a corresponding read line RL connected to each corresponding semiconductor photodetector 102.

The same operation described above is repeated row-by-row (e.g., from the first row to the last row) in each frame of inserted image to drive a plurality of first scan lines Scan1 and a plurality of second scan lines Scan2. The plurality of semiconductor photodetectors in a two-dimensional region of the array detect a collection of a plurality of biometric signals corresponding to the two-dimensional region of the touch area. Each of the biometric signals is associated with a corresponding location information defined by each pixel unit location. The plurality of biometric signals and the location information correspond to a plurality of photo-current signals. As discussed above, a relatively weak photo-current signal corresponds to a ridge line region, whereas a relatively strong photo-current signal corresponds to a valley line region. Thus, the biometric signals associated with relatively weak photo-current signals correspond to ridge lines (e.g., of a palm), and the biometric signals associated with relatively strong photo-current signals correspond to valley lines (e.g., of a palm). The biometric information (e.g., palmprint information or fingerprint information) of the two-dimensional region of the touch area may be obtained by processing the plurality of biometric signals and identifying a plurality of ridge lines and valley lines.

In some embodiments, a first scan line Scan1 (or a second scan line Scan2) can be used to define an X-axis coordinate and a read line RL can be used to define a Y-axis coordinate for each subpixel 201 (containing a semiconductor photo-detector 102) associated with the biometric information. Using this coordinate system, the biometric information can be linked to specific locations on the touch screen. Accordingly, the biometric information can be displayed at the corresponding positions on the screen, achieving biometric recognition.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display panel, comprising:
   an array of a plurality of pixel units, each pixel unit comprising at least three subpixels for image display, each of the at least three subpixels comprising a first transistor, at least some of the plurality of pixel units comprising a semiconductor photodetector for detecting biometric information;
   a plurality of first scan lines and a plurality of data lines, each of the plurality of first scan lines being connected to a row of subpixels, each of the plurality of data lines being connected to a column of subpixels;
   a plurality of common voltage terminals, each of the plurality of common voltage terminals being connected to a semiconductor photodetector;
   a plurality of second scan lines, each of the plurality of second scan lines being connected to a plurality of semiconductor photodetectors for providing a control voltage signal; and
   a plurality of read lines, each of the plurality of read lines being connected to each semiconductor photodetector in a column of pixel units; and
   wherein each semiconductor photodetector comprises a second transistor; the second transistor being a phototransistor comprising a gate node connected to one of the plurality of second scan lines for receiving the control voltage signal to turn on the second transistor, and a first node connected to one of the plurality of common voltage terminals;

the control voltage signal is configured to be in a range such that a difference between a first photocurrent change corresponding to a touching ridge line and a second photocurrent change corresponding to a touching valley line is substantially maximized.

2. The display panel of claim 1, further comprising a plurality of touch electrodes and a plurality of touch signal lines, each touch electrode being connected to a touch signal line.

3. The display panel of claim 1, further comprising a plurality of signal lines, each of which is connected to a plurality of common voltage terminals.

4. The display panel of claim 3, wherein a second node of the phototransistor is connected to one of the plurality of read lines.

5. The display panel of claim 4, wherein the plurality of first scan lines, the plurality of second scan lines, and the plurality of signal lines are configured to drive the plurality of pixel units;
   each of the plurality of first scan lines in a first time period of each frame of image is configured to apply a first scan signal to each subpixel in the row of subpixels to allow a data signal be passed from one of the plurality of data lines to the each subpixel in the row of subpixels to produce a subpixel of image based on the data signal; and
   each of the plurality of second scan lines in a second time period of each frame of image is configured to apply a control voltage signal to each phototransistor in the row of subpixels and each of the plurality of signal lines in a second time period is configured to apply a common voltage signal via one of the plurality of common voltage terminals to each phototransistor in the row of subpixels, for detecting a biometric signal in each pixel unit; the second time period being later in time than the first time period.

6. The display panel of claim 3, wherein each semiconductor photodetector further comprises a third transistor comprising a gate node, a first node connected to a second node of the second transistor, and a second node connected to one of the plurality of read lines.

7. The display panel of claim 6, wherein the gate node of the third transistor is connected to one of the plurality of first scan lines.

8. The display panel of claim 6, wherein the plurality of first scan lines, the plurality of second scan lines, and the plurality of signal lines are configured to drive the plurality of pixel units; the gate node of the third transistor is connected to one of the plurality of first scan lines;
   each of the plurality of first scan lines in a first time period of a frame of image is configured to apply a first scan signal to each subpixel in the row of subpixels, allowing a data signal be passed from one of the plurality of data lines to the each subpixel in the row of subpixels to produce a subpixel of image based on the data signal;
   each of the plurality of second scan lines in a second time period of each frame of image is configured to apply a control voltage signal to each phototransistor in the row of subpixels and each of the plurality of signal lines in a second time period is configured to apply a common voltage signal via one of the plurality of common voltage terminals to each phototransistor in the row of subpixels, for detecting a biometric signal in each pixel unit; and
   each of the plurality of first scan lines in the second time period of each frame of image is configured to apply a third scan signal to switch on the third transistor in the row of subpixels to transmit the biometric signal detected in each pixel unit to one of the plurality of read lines; the second time period being later in time than the first time period.

9. The display panel of claim 6, wherein the plurality of first scan lines, the plurality of second scan lines, and the plurality of signal lines are configured to drive the plurality of pixel units; the gate node of the third transistor is connected to one of the plurality of first scan lines;
   each of the plurality of first scan lines in a first time period of each frame of image is configured to apply a first scan signal to each subpixel in the row of subpixels, allowing a first data signal be passed from one of the plurality of data lines to the each subpixel in the row of subpixels to produce a subpixel of image based on the first data signal;
   each of the plurality of first scan lines in a second time period of each frame of image is configured to apply a second scan signal to each subpixel in the row of subpixels to allow a second data signal be passed from one of the plurality of data lines to the each subpixel in the row of subpixels to produce a subpixel of image based on the second data signal so that a substantially same illuminance level for each pixel is produced; and
   each of the plurality of second scan lines in a second time period of each frame of image is configured to apply a control voltage signal to each phototransistor in the row of subpixels and each of the plurality of signal lines in a second time period of each frame of image is configured to apply a common voltage signal via one of the plurality of common voltage terminals to each phototransistor in the row of subpixels, for detecting a biometric signal in each pixel unit; the second time period being later in time than the first time period.

10. The display panel of claim 1, wherein each subpixel further comprises a pixel electrode; a second node of the first transistor being connected to the pixel electrode.

11. The display panel of claim 1, wherein each pixel unit comprises a red subpixel, a green subpixel, and a blue subpixel, wherein the semiconductor photodetector is in the blue subpixel.

12. A display panel, comprising:
   an array of a plurality of pixel units, each pixel unit comprising at least three subpixels for image display, each of the at least three subpixels comprising a first transistor, at least some of the plurality of pixel units comprising a semiconductor photodetector for detecting biometric information;
   a plurality of first scan lines and a plurality of data lines, each of the plurality of first scan lines being connected to a row of subpixels, each of the plurality of data lines being connected to a column of subpixels;
   a plurality of common voltage terminals, each of the plurality of common voltage terminals being connected to a semiconductor photodetector;
   a plurality of second scan lines, each of the plurality of second scan lines being connected to a plurality of semiconductor photodetectors for providing a control voltage signal;
   a plurality of read lines, each of the plurality of read lines being connected to each semiconductor photodetector in a column of pixel units;
   a plurality of signal lines, each of which is connected to a plurality of common voltage terminals; and
   a plurality of touch electrodes and a plurality of touch signal lines, each touch electrode being connected to a touch signal line;

wherein each semiconductor photodetector comprises a second transistor and a third transistor; the second transistor being a phototransistor comprising a gate node connected to one of the plurality of second scan lines for receiving the control voltage signal to turn on the second transistor, and a first node connected to one of the plurality of common voltage terminals, the third transistor comprising a gate node, a first node connected to a second node of the second transistor, and a second node connected to one of the plurality of read lines;

the gate node of the third transistor is connected to one of the plurality of first scan lines;

the plurality of first scan lines, the plurality of second scan lines, and the plurality of signal lines are configured to drive the plurality of pixel units;

each of the plurality of first scan lines in a first time period of each frame of image is configured to apply a first scan signal to each subpixel in the row of subpixels to allow a first data signal be passed from one of the plurality of data lines to the each subpixel in the row of subpixels to produce a subpixel of image based on the first data signal;

each of the plurality of touch signal lines in a second time period of each frame of image is configured to apply a touch signal to each touch electrode for detecting a touch event at each touch electrode thereby determining a touch area comprising a plurality of subpixels where the touch event is detected;

if a touch event is detected, the display panel is configured to display an inserted image with equal illuminance level for each pixel;

each of the plurality of first scan lines in each frame of inserted image is configured to apply a second scan signal to each subpixel in the row of subpixels to allow a second data signal be passed from one of the plurality of data lines to the each subpixel in the row of subpixels to produce a subpixel of image based on the second data signal so that a substantially same illuminance level for each pixel is produced; and each of the plurality of second scan lines in each frame of inserted image is configured to apply a control voltage signal to each phototransistor in the row of subpixels in the touch area and each signal line in each frame of inserted image is configured to apply a common voltage signal via one of the plurality of common voltage terminals to each phototransistor in the row of subpixels in the touch area, for detecting a biometric signal in each pixel unit in the touch area.

13. The display panel of claim 12, wherein each of the plurality of first scan lines in each frame of inserted image is configured to apply the second scan signal to each third transistor in the row of subpixels for transmitting the biometric signal at the each pixel unit in the touch area to one of the plurality of read lines.

14. The display panel of claim 12, wherein the plurality of touch electrodes are used for conducting touch signals in the second time period, and for applying common voltage in the first time period.

15. The display panel of claim 12, wherein at least one of the plurality of touch signal lines is used as a read line in each frame of inserted image, and used as a touch signal line in second time period of each frame of image.

16. A method for driving an operation of a display panel, wherein the display panel comprises:

an array of a plurality of pixel units, each pixel unit comprising at least three subpixels for image display, each of the at least three subpixels comprising a first transistor, at least some of the plurality of pixel units comprising a semiconductor photodetector for detecting biometric information;

a plurality of first scan lines and a plurality of data lines, each of the plurality of first scan lines being connected to a row of subpixels, each of the plurality of data lines being connected to a column of subpixels;

a plurality of common voltage terminals, each of the plurality of common voltage terminals being connected to a semiconductor photodetector;

a plurality of second scan lines, each of the plurality of second scan lines being connected to a plurality of semiconductor photodetectors for providing a control voltage signal; and a plurality of read lines, each of the plurality of read lines being connected to each semiconductor photodetector in a column of pixel units;

wherein each semiconductor photodetector comprises a second transistor; the second transistor being a phototransistor comprising a gate node connected to one of the plurality of second scan lines for receiving the control voltage signal to turn on the second transistor, and a first node connected to one of the plurality of common voltage terminals;

the method comprises:

providing a plurality of control voltage signals respectively to the plurality of second scan lines in a time period of each frame of image; and turning on the phototransistor by one of the plurality of control voltage signals provided by one of the plurality of second scan lines;

wherein the one of the plurality of control voltage signals provided by one of the plurality of second scan lines is configured to be in a range such that a difference between a first photocurrent change corresponding to a touching ridge line and a second photocurrent change corresponding to a touching valley line is substantially maximized.

17. The method of claim 16, further comprising:

providing a plurality of first scan signals to the plurality of first scan lines in a first time period of each frame of image; each of the plurality of first scan lines in the first time period applies a first scan signal to each subpixel in the row of subpixels to allow a data signal be passed from one of the plurality of data lines to the each subpixel in the row of subpixels to produce a subpixel of image based on the data signal; and transmitting a plurality of biometric signals through the plurality of read lines; each of the plurality of read lines in a second time period is configured to transmit a biometric signal from each semiconductor photodetector, the second time period being later in time than the first time period;

wherein providing the plurality of control voltage signals to the plurality of second scan lines comprises providing the plurality of control voltage signals to the plurality of second scan lines in a second time period of each frame of image, each of the plurality of second scan lines in the second time period of each frame of image applies a control voltage signal to turn on each phototransistor in the row of subpixels.

18. The method of claim 17, further comprising providing a plurality of common voltage signals to a plurality of signal lines in the second time period of each frame of image; each of the plurality of signal lines in the second time period applies a common voltage signal via one of the plurality of common voltage terminals to each phototransistor in the row of subpixels for detecting a biometric signal in each pixel unit.

19. The method of claim 17,
wherein each semiconductor photodetector further comprises a third transistor; the third transistor comprising a gate node, a first node connected to a second node of the second transistor, and a second node connected to one of the plurality of read lines;
the method further comprising:
providing a plurality of common voltage signals to a plurality of signal lines in the second time period of each frame of image; each of the plurality of signal lines in the second time period applies a common voltage signal via one of the plurality of common voltage terminals to each phototransistor in the row of subpixels for detecting a biometric signal in each pixel unit; and
providing a plurality of third scan signals to the plurality of first scan lines in the second time period of each frame of image; each of the plurality of first scan lines in the second time period applies a third scan signal to switch on the third transistor in the row of subpixels for transmitting the biometric signal at each pixel unit to one of the plurality of read lines; the second time period being later in time than the first time period.

20. The method of claim 17, further comprising:
providing a plurality of second scan signals to the plurality of first scan lines in the second time period of each frame of image; each of the plurality of first scan lines in each frame of inserted image applies a second scan signal to each subpixel in the row of subpixels to allow a second data signal be passed from one of the plurality of data lines to the each subpixel in the row of subpixels to produce a subpixel of image based on the second data signal so that a substantially same illuminance level for each pixel is produced; and
providing a plurality of common voltage signals to a plurality of signal lines in the second time period; each of the plurality of signal lines in each frame of inserted image applies a common voltage signal via one of the plurality of common voltage terminals to each phototransistor in the row of subpixels, for detecting a biometric signal in each pixel unit.

* * * * *